United States Patent [19]

Bossmann et al.

[11] Patent Number: 5,017,423

[45] Date of Patent: May 21, 1991

[54] FIBER, FILAMENT, YARN AND/OR FLAT ARTICLES AND/OR NONWOVEN MATERIAL CONTAINING THESE, AS WELL AS A PROCESS FOR PRODUCING THE FORMER

[75] Inventors: Adelgund Bossmann, Krefeld; Eckard Schollmeyer, Kempen, both of Fed. Rep. of Germany

[73] Assignee: German Textile Research Center North-West, Fed. Rep. of Germany

[21] Appl. No.: 930,876

[22] Filed: Nov. 14, 1986

[30] Foreign Application Priority Data

Nov. 14, 1985 [DE] Fed. Rep. of Germany ....... 3540411
Sep. 10, 1986 [DE] Fed. Rep. of Germany ....... 3630769
Oct. 25, 1986 [DE] Fed. Rep. of Germany ....... 3636395

[51] Int. Cl.$^5$ .............................................. D02G 3/00
[52] U.S. Cl. ...................... 428/224; 219/121.65; 219/121.66; 219/121.85; 264/22; 428/229; 428/399; 428/400; 428/401
[58] Field of Search .............. 156/272.8; 219/121 L, 219/121 LE, 121 LF, 121 LH, 121 LJ, 121 LM, 121.85, 121.65, 121.66; 427/53.1; 428/400, 401, 224, 229, 399; 8/444; 264/22, 25; 104/157.61

[56] References Cited

U.S. PATENT DOCUMENTS

| 3,560,291 | 2/1971 | Foglia et al. ...................... 156/272.8 |
| 3,600,289 | 8/1971 | Bragole ............................. 156/314 |
| 4,457,817 | 7/1984 | Bobeth et al. ...................... 264/25 X |
| 4,613,470 | 9/1986 | Aftalion ............................ 264/22 |
| 4,629,858 | 12/1986 | Kyle ............................... 219/121.85 |

FOREIGN PATENT DOCUMENTS

| 0117561 | 9/1984 | European Pat. Off. . |
| 0173925 | 3/1986 | European Pat. Off. . |
| 3138474 | 4/1983 | Fed. Rep. of Germany ..... 427/53.1 |
| 2053789 | 2/1981 | United Kingdom . |

OTHER PUBLICATIONS

Japanese Patents Gazette, Feb. 25, 1976, Abstract J50069-310 (Asahi Chem Ind KK).
Article entitled: "Erzielung von Struktureffekten an Syntheseseiden durch Warmebehandlung mittels $CO_2$-Laserstrahlen[1])" pub. in Textiltechnik, vol. 31, pp. 545, et seq.
Article entitled: "An Indication of Molten Cellulose Produced in a Laser Beam", published in Textile Research Journal, vol. 44, No. 2, pp. 152-154.
van Veld et al., Morphology of Man-Made Fibers, 12 Journal of Applied Polymer Science, pp. 2709-2724, 1968.

*Primary Examiner*—Michael Lusignan
*Attorney, Agent, or Firm*—Andrus, Sceales, Starke & Sawall

[57] ABSTRACT

A fiber, a filament, yarn and/or a flat article and/or nonwoven material containing these, which has on its surface a microstructure consisting of dotted, linear and/or areal depressions and/or elevations, which have a depth or height, respectively, up to ca. 10 micrometers and extend across ca. 10% to 100% of the surface of the fiber and/or the filament.

A process for the manufacture of the fiber, the filament, yarn, flat article and/or nonwoven material provides that the fiber, the filament, yarn, flat article and/or nonwoven material is irradiated with a laser, and that as a result its surface is fused, melted on and/or removed in a dotted, linear and/or areal fashion.

38 Claims, 3 Drawing Sheets

FIBER, FILAMENT, YARN AND/OR FLAT ARTICLES AND/OR NONWOVEN MATERIAL CONTAINING THESE, AS WELL AS A PROCESS FOR PRODUCING THE FORMER

The invention concerns a fiber, a filament, yarns, flat articles and/or nonwoven or pile material containing these, as well as a process for producing the former.

There are known fibers, filaments, yarns, flat articles and/or nonwoven materials with varying surface structure. In synthetic polymer fibers, filaments, or the yarns made from these, this varying surface structure can be obtained, for example, by using spinning nozzles of differing designs during primary spinning, so that the fibers or filaments spun in this manner have a corresponding profile, which shows itself, for example, in a corresponding round, oval, triangular, starshaped or multicornered cross section. In addition, natural fibers, as for example cotton or wool yarns, can be changed by mercerizing or chlorinating. Here, the yarn is treated in an aqueous mixture containing alkaline or chlorine, that causes a change in the cross sectional shape of the cotton yarns and a change in the scale structure of the wool yarns; however, this is possible only within a small area without yarn damage, which manifests itself in varying dye affinity or printability or in loss of liquid. In addition, such processes do not structure, but rather smooth the surfaces.

In flat articles one must distinguish between the mechanical and chemical processes used to change the surface. Thus, mechanical processes are based on the fact that the surface of the flat article is embossed by means of a structured roller pair located in the calender in accordance with the structuring of the rollers. Here, the degree of embossing depends on the respective goods, the embossing temperature and pressure. Such surface changes caused by mechanical deformation have the disadvantage that in many cases they are not permanent and are no longer present after short-term use or after repeated maintenance treatment of the flat article. In addition, there is always the danger during the embossing process that dirt or yarn particles are deposited on the roller pair, which results in faulty and non-correctible deficiency of the goods. Also, due to the roller pairs which are used, embossing has limits set by the dimensions of the structuring, so that the latter usually has a length, width and depth of several millimeters and is therefore relatively coarse with respect to the dimensions of the fibers or filaments.

As for the chemical processes for changing the surface, the hydrolysis processes for flat articles of triacetate and polyester fibers must be mentioned in particular. Here, the flat article is usually treated for a certain time at a certain temperature in a mixture containing alkali, during which treatment, depending on the alkali concentration, treatment time and temperature, saponification of the fiber causes a denier decrease, while a structuring of the surface of the fibers, filaments or yarns used in the flat article does not take place. Rather, the surface of the fiber, or the filament or yarn, is smoothed by reduction.

DE-OS 32 03 973 describes a process for the production of fibrillated fibers. Here, a polymer granulate is compacted to a certain bulk weight in such a manner that it contains gas occlusions. Subsequently the granulate is sintered to a certain depth, and an intermediate product is created. During this process the gases occluded in the intermediate product escape. This creates small blisters having craters on their surface, which blisters are distributed over the cross section of the intermediate product. Subsequently, the intermediate product is stretched out of its natural shape, and it is at this point that the actual fiber is produced, while the stretching causes the craters on the surface to burst as the fibrils are formed. Consequently, a fiber produced in this manner has on its surface merely contrasting fibrils which, however, have a length of over 100 micrometers.

It is the purpose of the invention to provide a fiber, a filament, yarn and/or flat article and/or nonwoven material containing these, which has an especially large specific surface and thus a specifically good adhesiveness. In addition, the invention creates a process for the production of such a fiber or such a filament, yarn and/or flat article and/or nonwoven material containing these.

This purpose is attained by the invention by means of a fiber, a filament, yarn and/or flat article and/or nonwoven material with the characteristics described in the patent claims and by means of a process with the characteristics described in the patent claims.

The invention's fiber, or the invention's filament, yarn, flat article and/or nonwoven material has on its surface a microstructure consisting of dotted, linear and/or areal depressions and/or elevations, which have a depth, or height, 25 respectively, of up to 10 micrometers or microns and extend across ca. 10% to ca. 100% of the surface, of the fiber and/or the filament. As a result of the microstructuring, the invention's fiber or the filament, yarn, flat article and/or nonwoven material has, as compared with traditionally formed fibers, filaments, yarns, flat articles or nonwoven materials, a considerably enlarged specific surface, which is the case particularly when the depressions, or elevations, respectively, extend over the entire surface of the fibers, or filaments, respectively, which have been worked into the yarn, flat article or nonwoven material. Such an increase in the specific surface includes a series of advantages.

To begin with, it improves the adhesiveness, for example with coatings, gluings, pigments with bonding systems or similar items, since these coatings etc. are not only more strongly absorbed or adsorbed because of the increased roughness of the surface, but also because they are much more firmly deposited and bound in the surface and with much greater resistance to mechanical stresses. Also, because of the microstructure and the concomitant roughness, the frictional resistance between the fibers or filaments which have been worked into a yarn, flat article or nonwoven material is increased, so that their movement relative to each other is considerably more dificult. In the case of yarns, this results for example in increased strength, and in the case of flat articles or nonwoven materials it results in an improvement of sliding resistance and possibly of seam strength. Likewise, the absorptive capacity of the microstructured surfaces of the fibers, filaments, yarns, flat articles and/or nonwoven materials is increased, which manifests itself, particularly in synthetic fibers, as improved physiological and/or permanent antistatic properties. As a result of the increase of the specific surface the invention's fibers, filaments, yarns, flat articles or nonwoven materials have excellent filtration properties, so that they can be used particularly well, for example, for the production of filters for the filtration of beverages or for the separation of fine dust in room climate controls. The invention's fibers, filaments, yarns, flat articles and/or nonwoven materials also offer a series of advantages in the field of medicine. They can be used, for example, for the production of surgical sewing material or prosthetic articles, such as artificial veins, which have considerably greater resorptive capacity as compared with traditional fibers, filaments, yarns, flat articles or nonwoven materials. Likewise, microstructured hollow fibers used in artificial kidneys have considerably improved exchange coefficients as compared with traditional hollow fibers.

In the area of fiber-reinforced materials, as, for example, fiber-reinforced plastics, tires, or fiber-reinforced concrete, the microstructured surfaces of the fibers, filaments, yarns, flat articles and/or nonwoven materials have, as a result of the improved surface roughness, improved adhesiveness to the matrix surrounding them, as, for example, rubber, plastic or concrete, which manifests itself, for example, in longer surface life and increased strength.

Depending on the respective application and the concomitant required or desired surface enlargement, the depressions and/or elevations of the microstructure can also extend over only part of the surface of the fiber or the filament, for example between ca. 20% and ca. 80%. The general rule is that the size of the microstructures area decreases with increased working-in of the fiber or the filament into the yarn, flat article or nonwoven material. Thus, in case of relatively loosely adjusted yarns, flat articles or nonwoven materials, the depressions and/or elevations of the microstructure extend preferably over ca. 60 to 80% of the surface of the fibers or filaments worked into the yarn, flat article or nonwoven material, and in relatively densely adjusted yarns, flat articles or nonwoven materials they extend over ca. 40 to 60% of the surface of the fibers or filaments worked into the yarn, flat article or nonwoven material.

In a preferred version of the fiber, filament, yarn flat article and/or nonwoven material of the invention, the microstructure is formed as linear depressions and/or elevations, which extend mostly transversely to the longitudinal axis of the fiber or the filament. The linear depressions and/or elevations have depths, or heights, respectively, between ca. 0.1 micrometer and ca. 2 micrometers, preferably between ca. 0.5 micrometer and ca. 1 micrometer, and widths up to ca. 1 micrometer, preferably between ca. 0.3 micrometer and 0.6 micrometer. Their mutual distance is between ca. 1 micrometer and ca. 5 micrometers, preferably between ca. 1 micrometer and ca. 3 micrometers.

In addition the fiber, filament, yarn, flat article or nonwoven material of the invention can include reacting groups, such as, for example, basic or acid groups, in the area of the surface of the fiber or the filament. Preferably the area is that section of the fiber or filament surface which includes the above-described microstructure.

The invention's process for the production of the above-described fiber, the filament, yarn, and/or flat article and/or nonwoven material containing these, is built on the basic idea not to change the surface of the fiber, filament, yarn, flat article and/or nonwoven material by mechanical deformation, as in the above-mentioned state of technology, but by means of dotted, linear or areal fusing, melting-on and/or reduction, the necessary energy being generated by a laser. By synchronizing the wave length and energy of the laser beam and the size or form of the irradiated area with the respective substrate to be treated, it is possible to provide the surface of the fiber or the filament with a variably formed microstructuring, which at the same time causes a corresponding enlargement of the surface, as well as to partially reduce the surface as viewed toward the cross-section, and thus to obtain a denier reduction.

Such a process, as compared with the above-mentioned state of technology, has a series of advantages. It is possible, for example, to use the invention's process in an especially simple manner with fibers, filaments or yarns on the one hand, and with flat articles and nonwoven materials on the other, since the above-described surface structuring or denier reduction occurs without contact. For this reason the device used for such a process does not need special equipment adjusted to the geometry of the respective substrate to be treated, such as, for example, correspondingly formed roller-pairs in the known calender. In addition, the surfaces created by the invention's process are, as described above, very finely structured, while this structuring is permanent in subsequent use and especially with respect to extreme maintenance treatments, since it is not based on a mechanical deformation of the surface, as in the state of technology cited above, but rather on fusing, melting-on or reduction of the same. Also, as compared with the known processes the invention's process is considerably safer for the environment, since chemicals such as chlorine or lye solutions are not required for structuring the surface. Furthermore, rinsing or treatment baths heated to corresponding temperatures are not necessary, which thus results in energy and water savings. Also, in the invention's process the derivative products of the fibers or filaments generated during the microstructuring or denier reduction do not get into the waste water, since they evaporate due to the energy provided by the laser and can be separated from the exhaust air with relatively little effort, for example by means of correspondingly designed filters or condensers.

In the invention's process, the choice of the laser is based on the fiber substrate to be treated and on the respective energy, wave length and power of the laser-generated beams. Basically any laser can be used which can generate beams with a corresponding energy, wave length of power which is sufficient to accomplish the above-described fusing, melting-on or reduction of the surface. Thus, for example, rare gas ion lasers are suitable, such as Ar or Kr ion lasers that operate in a wave length range between ca. 400 nm and ca. 800 nm and which can be tuned to individual wave lengths. Likewise, the radiation can be accomplished with a Neodymium-Yag laser (Nd-YAG) with a wave length of 1 micrometer. CO-lasers with a wave length of 5.2 10 micrometers, or $CO_2$ lasers with a wave length between 9.6 to 10.6 micrometers can be used, too. Other gas lasers, which normally operate in a wave length range between ca. 157 and 351 nm, are also suitable, where wave length reductions can be effected by means of frequency multiplication. Especially suitable for generating laser beams are the Excimer lasers, which use as the laser medium, for example, $F_2$, ArF, KrCl, KrF, XeCl, $N_2$ and XeF and which generate beams with a wave length 157 nm, 193 nm, 222 nm, 248 nm, 308 nm, 337 nm, and 351 nm. The respective surface to be treated can be treated with a beam impulse as well as a permanent beam. With respect to the energy of a pulse beam one must consider that, with pulse duration between ca. $10^{-3}$ and $10^{-15}$ seconds, preferably between ca. $10^{-3}$ and ca. $10^{-8}$ seconds, the energy should be between ca. 5 and ca. 500 mJ/cm$^2$, preferably between ca. 20 and ca. 50 mJ./cm$^2$. Of course, it is also possible to treat the fiber, the filament, yarn, flat article and/or materials with a multitude of laser beam impulses, preferably between ca. 5 and ca. 20, with a repetition rate of ca. 1 to 250 Hz, especially between ca. 1 to 5 Hz or ca. 200 to ca. 250 Hz.

In addition, the beams, or beam, generated by the laser can be expanded by means of a corresponding device placed in the beam path, so that in this way a larger area of the surface is irradiated. However, it is preferable to focus the beam or beams, in order to treat a correspondingly smaller surface area with increased radiation power or energy. By variation of the distance between the expansion or focusing device and the irradiated surface, the invention's process makes it possible to control the degree of surface structuring in an especially simple manner.

If the invention's process is used for finishing fibers, filaments and/or yarns, it is preferable to irradiate either the surface of the fibers or filaments or the surface of the yarn from all sides, regardless of the intended use. If the invention's radiation treatment is to be used for synthetic fibers or filaments, it would be advantageous to conduct the treatment immediately after primary spinning, since at this time the surface of the individual fibers or individual filaments, as viewed across their circumference, is still accessible from all sides. Such radiation should preferably always be conducted in such cases where the surface of the individual fibers or the individual filaments has a considerable effect on the properties of the finished products such as, for example, yarns, flat articles or bulk materials. If, for example, such fibers or filaments are used for the production of filters, the latter have considerably better filtering properties than traditional filters as a result of the enlargement of the surface. For the same reason, hollow fibers used in dialysis processes which have been irradiated as individual fibers have considerably higher exchange coefficients than non-radiated fibers. In addition, the surface enlargement increases fiber-to-fiber and filament-to-filament adhesiveness, which results in the fact that yarns or fleeces produced with these fibers or filaments have considerably greater strength and a better yarn of fleece cohesion.

Yarn should be irradiated especially in those cases where its surface decisively affects the properties of the finished product. This applies, for example, to yarns which are flocked or printed with pigmented coloring substances, since the flocking material or the pigmented coloring substance adheres considerably better to the yarn as a result of the surface enlargement or structuring obtaining by irradiation. For very densely adjusted flat articles or bulky materials it can also be recommended not to irradiate these, but instead the yarn used in their production, since the high material density makes it difficult to gain access from all sides to the surface of the yarns used in these flat articles or bulky materials.

It is of course also possible to use the invention's process with flat articles or bulk materials. Generally speaking, such treatment is suitable in such cases where the properties of the flat article or the bulky material depend decisively on irradiation-accessible surfaces of the fibers, filaments and/or yarns which have been worked into the flat article or the bulky material. Thus, for example, the invention's process can improve in flat articles the sliding resistance, the adhesiveness to coatings and pigmented systems and the absorptive capacity, and thus the physiological properties, to a considerable degree, which is attributed to a corresponding surface enlargement or structuring. It is further possible, by using the invention's process, to change the feel, or fall, of the flat article as the result of the denier reduction in such a way that flat articles can be produced which are correspondingly looser and laterally drooping.

As far as the material of the fiber, the filament, yarn, flat article or nonwoven material is concerned, it must be generally noted that basically the invention's process can be used to treat any material whose surface can be correspondingly fused, melted-on or reduced. Preferably synthetic fibers, filaments and/or yarns and/or flat articles or nonwoven materials containing these are irradiated which contain, for example, fibers of polyester, polyamide, polyacrylnitril, polypropylene, polytetrafluortetraethylene, polyurethane, polycarbonate, acetate, triacetate, aramide, carbon, graphite and glass. The invention's process is also applicable for natural fibers, such as cotton fibers.

Another version of the invention's process provides that only certain sections of the yarn or flat article are irradiated in order to obtain pattern effects in this way. The cause for such pattern effects can be seen in a varying light reflection and/or matting which exists between the radiated and non-radiated sections. Such patterned irradiation can be achieved, either by moving an endless web of the yarn or the flat article relative to the laser and covering the laser radiation temporarily in a planned manner, or by moving instead a laser beam relative to the surface of the yarn or the flat article in a predetermined pattern which corresponds to the pattern which is to be created.

The last-mentioned process has the advantage that the surface of the yarn or flat article can be irradiated from all directions and that, therefore, patterns can be created which are primarily oriented in one direction. As already mentioned, the microstructuring causes a surface enlargement in the irradiated areas, with the result that, during subsequent dyeing, the irradiated areas have a greater dye absorption capacity and are thus colored more deeply and/or differently from the color shade.

There are two possibilities for using such a process, in which the laser beam is moved according to a predetermined pattern, in treating endless webs of yarns or flat articles. In one version of such a process the endless web is moved step-by-step over a certain distance, and during the stops of the web the light beam is moved across the respective web section according to the predetermined pattern. In the second version, the endless web of the yarn or the flat article is moved relative to the laser and the light beam is moved according to the predetermined pattern, while the conveying speed of the web and the speed of the light beam movement are synchronized. The first-mentioned version is particularly suitable for patterns running transversely to the direction of the web movement, and the second version is suitable particularly for patterns which are primarily oriented in the direction of the web movement.

In a further development of the above-described process, the wave length, energy and/or power of the light beam generated by the laser can be altered. This makes possible the production of patterns within patterns, since varying degrees of fusing, melting-on and/or reduction of the surface of the yarn or flat article are caused depending on the wave length, energy and/or power of the light beam. In addition, a bundle of light beams can be used to produce such interior patterns, where, for example, individual light beams have differing wave lengths. Likewise, a bundle of light beams can be used advantageously when relatively large-surface patterns are to be produced.

In order to achieve the above-described movement of the light beam in a simple manner, it is preferably to direct a light beam at the yarn or flat article which is reflected from a reflection device, such as, for example, a dielectric mirror, and to move the reflection device according to the predetermined pattern. Because of the relatively low weight of the reflection device it can be moved relatively quickly and easily, so that even relatively complicated, involved patterns can be produced. It is, of course, also possible to direct the light beam generated by the laser directly at the selected section of the yarn or the flat article and to move the laser according to the predetermined pattern; however, the relatively large weight of the laser necessitates a relatively expensive mounting of the latter.

Likewise, instead of a single light beam a bundle of light beams can be used, which is expanded or focused by suitable devices located in the light beam path, so that expansion permits the radiation of a greater area with relatively less power, and focusing permits the radiation of a correspondingly smaller area with increased power or energy. The degree of surface change and the respective irradiated area can be controlled in an especially simple manner by varying the distance between the expanding or focusing device and the laser, so that an additional possibility for patterning within the pattern exists.

The above-described process can be applied in various ways. For example, if pile fabric is chosen for this process and this pile fabric is irradiated from the right side, i.e. the pile side, with a relatively high light beam energy or power, pile articles with especially simple patterns can be produced in this manner, which have shortened pile nubs in the irradiated sections as compared with the non-irradiated sections. With the present state of technology, this type of patterned pile goods can be produced only at great cost by special weaving processes or by embossing, and embossed pile goods often lose their embossing with advanced use, especially after repeated cleaning. However, this can not occur with the invention's process, since the above-described shortening of the pile nubs is irreversible as a result of their partial reduction. If this type of process is applied to pile goods which have already been dyed, one gets a pile article which is patterned shade-in-shade, while the varying light reflection between the irradiated and the non-irradiated sections even heightens the pattern effects caused by shortening the pile nubs. On the other hand, if the pile goods are irradiated before dyeing, varying dyeability will also result, which manifests itself, for example, in a color difference and/or a shift of color shades. The possibility also exists to produce an internally patterned pattern by varying the wave length, energy or power of the light beam, in that the pile nubs within the pattern are reduced to varying degrees and thus have different lengths. If this is not desired, it is advisable during irradiation to reorient the pile goods, for example at an edge, in such a way that the light beam, or the bundle of light beams, can be directed at the nubs which are to be reduced without interference from the adjacent nubs. Especially good results are obtained if the pile goods are reoriented at an angle between ca. 120° and ca. 160°.

Likewise, such a process can be used in a particularly simple manner to produce burnout articles, for example of polyester or cotton yarns. In the areas of the flat article which are determined by the chosen pattern, the polyester portion of the yarn is reduced, so that, as the result of the removal of the polyester portion, the irradiated areas have, as compared with the non-irradiated areas, a considerably reduced material density, which stands off clearly as a pattern from the remaining areas. Such burning-out can not be done with the traditional processes, since the cotton portion is always oxydatively removed. Furthermore, as compared with the known process the invention's process has the advantage, that in the case of burn-out articles the removal of the polyester portion does not require any chemicals and expensive rinsing baths, since the polyester portion is removed by the laser beam's energy and the resulting derivative products can easily be removed from the exhaust air at relatively low cost, for example by means of suitably constructed filters or condensers.

Likewise, the invention's process can be used for flat articles which are coated on one side. These are, for example, the traditional coatings on a synthetic polymer base, such as, for example, polyvinylchloride, polyvinylacetates, polyvinylethers, polyurethanes, and similar types, or on a natural polymer base, as for example natural rubber. Flat articles coated in this manner have the disadvantage, that clothing items made from them, as, for example, shoes, weather protection clothing etc., have very poor wearing properties, since the impermeability of the coating does not permit any vapor exchange between the body of the user and the ambient atmosphere. If, on the other hand, a flat article coated in this manner is irradiated on its coating side by a light ray generated by a laser beam in such a way that, in accordance with a predetermined pattern, the coating in the irradiated areas is reduced, preferably in dot-fashion, this will result in a coated flat article which is penetrated by micropores, while the micropores cause water vapor permeability, but no water permeability. Furthermore, use of the invention's process offers the possibility for providing, in selected areas of the flat article, an especially large number of such micropores, so that these areas can be used in subsequent clothing manufacture for making clothing sections such as armpit sections, where increased water vapor exchange is desirable because of increased transpiration. Thus, the invention's process permits the production of especially well coated flat article which, as viewed across their surface, have a graduated water vapor permeability.

Of course, it is also possible to conduct a bilateral irradiation of flat articles instead of the unilateral irradiation described above. However, this is done only in such cases where both sides of the flat article affect its properties. Thus, the process of the invention can be used, for example, to treat shaft-patterned weaves in such a way that the warp threads running over a longer stretch at both sides of the flat article, which are not tied into the basic weave outside the pattern, can be severed immediately at the edge of the pattern by the light ray generated by the laser. For this purpose it is suitable to chose a light ray whose energy, power or wave length is so great that it reduces several warp threads simultaneously across their profile, and in so doing glues the warp threads at their lower end to the basic weave, which results in especially firm attachment of the warp threads, which are tied into the pattern over a relatively short distance.

If the invention's process is used for the production of patterned yarns, it is preferable to irradiate the yarns from all sides, as viewed across their profile. This can be achieved, for example, by irradiating the surface of the yarn simultaneously from various directions with several light rays, which are generated by a corresponding number of lasers, while the light rays are preferably reflected at the yarn surface by reflection devices placed concentrically around the yarn and being moved according to the predetermined pattern.

In order to prevent a chemical change in the surface of the irradiated fiber, filament, yarn, flat article and/or nonwoven material, it is advisable to surround these during irradiation with a protective or inert gas atmosphere. For this purpose, for example, nitrogen or rare gases are used. Likewise, the radiation can be undertaken in a vaccum. Such a method is required especially for substrates which are easily oxidizable at elevated temperatures because of their chemical structure, as this is the case, for example, with polyamides or polypropylenes.

If, on the other hand, a chemical modification of the surface is made in addition to its microstructuring, it becomes advisable to replace the above-described protective or inert gas with a reacting gas wholly or partly during laser irradiation. The energy required for the chemical modification is supplied by the laser beam or beams.

To explain the chemical modification of the surface occurring in this type of version of the invention's process it is assumed that, during the dotted, linear or areal fusing, melting-on and/or reduction of the irradiated surface, a corresponding splitting of polymer macromolecules located at the surface causes the formation of reactive centers. These reactive centers then react with the reacting gas present during the irradiation. Likewise, it is possible that the gas present during the laser irradiation is decomposed into a reacting condition simultaneously with, or exclusively because of, the laser irradiation, for example radicalization or ionization, and that the gas activated in this way reacts with the fused or melted-on surface of the fibers, filament, yarn, flat article and/or nonwoven material.

This type of process has the advantage that, as the result of the variations of the conditions of laser irradiation by changing, for example, the time, the irradiated area, energy and/or wave length, the supplied amount of gas and the chemical composition of the gas atmosphere, the respective obtained chemical and physical surface modification can be particularly well controlled. The general rule is that with increasing energy of the laser radiation and increasing reacting capacity of the gas or gases used, the degree of surface modification increases. In addition, in the invention's process, the chemical modification of the irradiated fiber, filament, yarn, flat article and/or nonwoven materials occurs preferably only in a limited surface area, as seen across the thickness, so that a loss of stability or changes of the other thermal-mechanical properties, such as, for example, the stress-strain behavior, do not take place.

Basically any gas which is reactive, or can be changed into a reactive gas by laser radiation, can be used for such a process. Acid or basic gases are preferable, which can be, for example, oxygen compounds with carbon, nitrogen and sulfur, and/or hydrogen compounds of nitrogen, and/or nitrogen-organic compounds, such as amines. Thus, for example, the use of carbon dioxide, sulfur dioxide or sulfur trioxide during irradiation can produce chemically modified surfaces, where the macromolecules located at the surface have additional acid groups. If, on the other hand, the macromolecules at the surface are to have additional basic groups, one merely has to use suitable gases during irradiation, such as amines or ammonia. Furthermore, in the invention's process the chemical modification of the surface can be conducted in such a way that the macromolecules have acid as well as basic groups. For this purpose one merely has to conduct the laser irradiation first in an acid gas atmosphere and then in a basic gas atmosphere or vice versa.

In a further version of the invention's process an interhalogen compound and/or a halogen-hydrogen compound can be used instead of the above-described gases. As a result, correspondingly halogenized macromolecules are created in the area of the irradiated surface, which molecules are available as reactive centers for further reactions, for instance reticulation or grafting reaction.

If an organic compound is used as the reacting gas, which compound has at least a double or triple bond, branching molecules can be created in selected areas of the surface, which in addition can still be oligomerized or polygomerized in the lateral chain, depending on the respective organic compound being used.

Likewise, nitrogen, carbon or oxygen-containing gases, such as methylisocyanate, can be used as reacting gases in the invention's process. Phosgene is also suitable in order to create reacting centers at the surface of the irradiated substances.

If the irradiated polymer substrate contains blocked reacting groups, as, for example, blocked isocyanates, these can be changed into a reactive state by radiation, which results in corresponding unilateral or universal surface reticulations.

In the invention's process where chemical modification of the surface is undertaken in addition to microstructuring, the choice of laser is based on the respective fiber substrate to be treated, the desired physical and chemical surface modification and the required energy, wave length and power of the laser beam. Basically any lasers can be used which are capable of generating light rays with a power which is large enough to achieve the desired microstructuring and the above-described activation of the irradiated areas of the surface and/or the gases used. The above-described lasers are preferably used for this purpose. In this type of version of the process it is, of course, also possible to treat the surfaces of the fiber, filament, yarn, flat article and/or nonwoven material entirely or in selected areas with a single laser beam, a laser beam impulse or a multitude of laser beam impulses, if the latter has/have the already mentioned powers and the above-mentioned repetition rate. The laser beam can also be focused or expanded, as this has already been described above. This permits a simple control, not only of the degree of microstructuring, but also of the degree of chemical surface modification.

Furthermore, this invention concerns a device for executing the process. Here, the invention's device includes a conveyor for an endless web of fibers, filaments, yarns, flat articles or nonwoven materials, and a laser, which is directed at the endless web and which generates the radiation. The conveyor transports the endless web continuously at a certain transport speed.

By synchronizing the transport speed, the area irradiated by the laser, and the power or energy of the generated beams with the respective substrate to be treated it is possible to control the resulting surface change, which manifests itself in a microstructuring and, as the case may be, in a chemical modification.

A further version of the invention's device provides that in the beam path between the laser and the endless web either an expansion device or a focusing device is placed, by which the surface of the irradiated area can be enlarged or decreased.

In order to create the possibility for irradiating the endless web from two sides, another version of the invention's device has a second laser, which relative to the web is located opposite the first laser.

A version of the invention's device which is particularly suited for fibers, filaments, or yarns is equipped with a reflection device instead of a second laser, which reflection device reflects the beams generated by the first laser in such a way that, viewed across their profile, the entire surface of the fibers, filaments or yarns is uniformly irradiated. Preferably, the reflection device is a dielectric mirror.

The invention's process can be applied in various ways. Thus, for example, it can be used for fibers, filaments, yarns, flat articles or nonwoven materials which are subsequently made into compact materials by coating, such as fiber-reinforced plastics. If the laser irradiation is conducted in the presence of a reacting gas, this results, particularly in synthetic fibers, filaments or yarns, not only in a microstructuring, but also in a chemical modification of the surface. Such synthetic fibers, filaments or yarns are, for example, polyester, polyamide, polyacrylnitril, polypropylene, polytetrafluoetheylene, polyurethane, polycarbonate, acetate, triacetate, aramide, carbon, graphite and glass fibers. This causes a marked improvement of the adhesion between the coating and the fibers, filaments, yarns, flat articles or nonwoven materials worked into it. The gas, or gases, used during the irradiation is/are adapted to the chemical composition of the coatings in such a way that such reactive groups are created in the surface area of the irradiated substrate by chemical modification, or grafting, which react with the coating, or generally, with the matrix, by creating a physical and/or chemical bond. The same applies to the treatment of the surfaces of textile polymers, which are used in metal-coated textiles, laminates, and metallized yarns or filaments which are utilized, for example, as protective clothing for radar rays, or for clean-rooms in the pharmaceutical or electrical industry. In addition, the microstructuring, alone or together with the chemical modification, causes in fiber-reinforced concrete an improvement of the bond between the concrete and the fibers, the flat article or nonwoven material worked into it. Likewise, a flat article or nonwoven material treated with invention's process can be used as the primary layer for compact material, such as brake disks or tire cord.

The fibers, filaments, yarns, flat articles or nonwoven materials treated with the invention's process also have application in the medical field. They can be used, for example, for the production of surgical sewing material or prosthetic articles, as, for example, artificial veins which, as compared with non-radiated, superficially not microstructured and/or chemically modified substrates, have a considerably greater resorptive capacity.

Likewise, microstructured hollow fibers used in dialysis have, as compared with non-irradiated hollow fibers, considerably higher exchange coefficients, which can be further improved by additional chemical modification of the surface. The same applies to filters which were made with irradiated fibers, filaments, yarns, flat articles or nonwoven materials. As compared with conventional filters they have considerably improved filtration properties, which is manifested, for example, by greater separating capacity, longer service life etc. Such filters are excellent for wet filtration, as, for example, sterile filtering of beverages such as beer, wine etc., as well as for dry filtration, especially for the separation of fine dust in cleanrooms or gas masks.

Advantageous futher developments of the invention's fibers, filaments, yarns, flat articles or nonwoven materials, as well as of the invention's process and the invention's device for implementing the process are stated in the subclaims.

In the following, the invention is explained in greater detail with the help of drawings and the use of forms of embodiment. Shown are.

Figure 1:
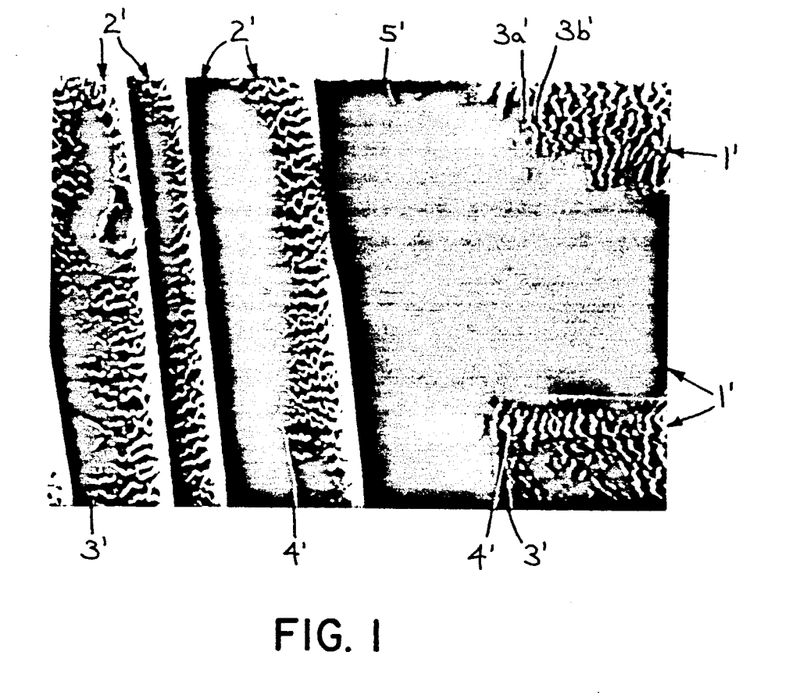
FIG. 1 an electron-microscope screen photo of an area of irradiated polyester fabric, enlarged 800 times.

FIG. 1 shows an electron-microscope screen photo of an irradiated polyester fabric in 800× enlargement. A section of the fabric was irradiated with a KrF Excimer laser at a wave length of 248 nm; 10 beam impulses with a repetition rate of 5 Hz and an energy of 200 mJ/cm$^2$ per pulse were emitted by the laser. The transverse wefts as well as the longitudinal warps, which are fiber yarns, have a microstructure consisting of linear, wavy depressions 3' and corresponding elevations 4', which are predominantly located transversely to the longitudinal axis of the fiber. The depressions 3' or the elevations 4' have a depth or height between ca. 0.6 and ca. 0.8 micrometer, and the distance between adjacent depressions 3a' and 3b' is between ca. 2 micrometers and ca. 3 micrometers. Their width is ca. 0.4 micrometer and ca. 0.6 micrometer, respectively. In addition, FIG. 1 shows non-irradiated areas 5' in the weft material 1', which occurred because the warp material 2' covered these areas 5'.

Figure 2:
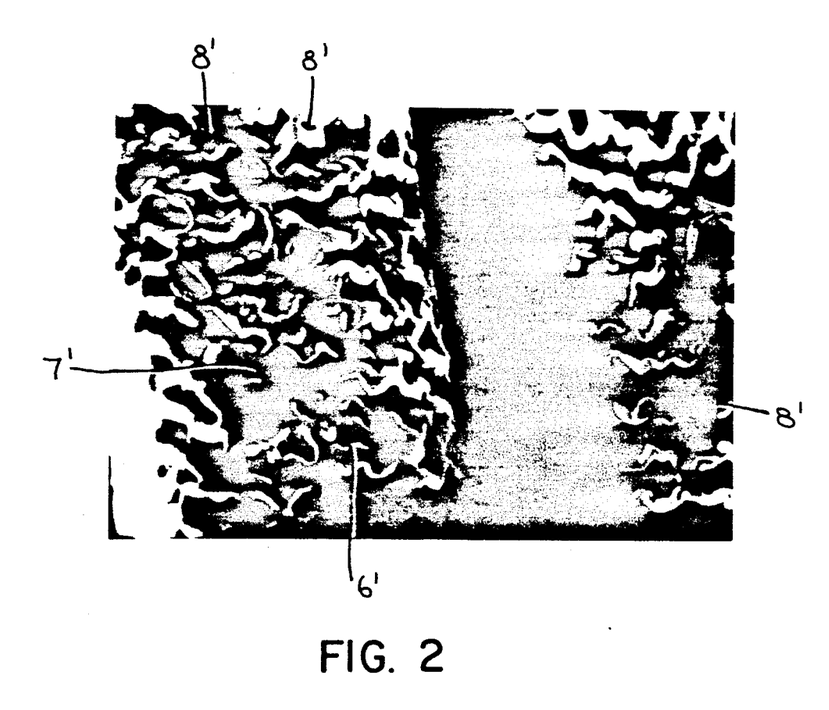
FIG. 2 an electron-microscope screen photo of an area of a polyester multi-filament yarn, enlarged 2,800 times.

The microstructure shown in FIG. 2, which is an area of the surface of an irradiated polyester multifilament yarn which was treated under the above-described conditions, has, in addition to the above-described linear depressions and elevations, areal depressions 6' and areal elevations 7'. These have an area of ca. 2 to ca. 4 micrometers$^2$ and a depth or height of ca. 2–3 micrometers. Their distribution is completely irregular across the surface of the fiber. In addition, dotted depressions 8' are present, which have an area of ca. 1 micrometer$^2$ with a depth of 1 micrometer to 2 micrometers. These, too, are distributed irregularly across the surface of the multifilament yarn.

Figure 3:
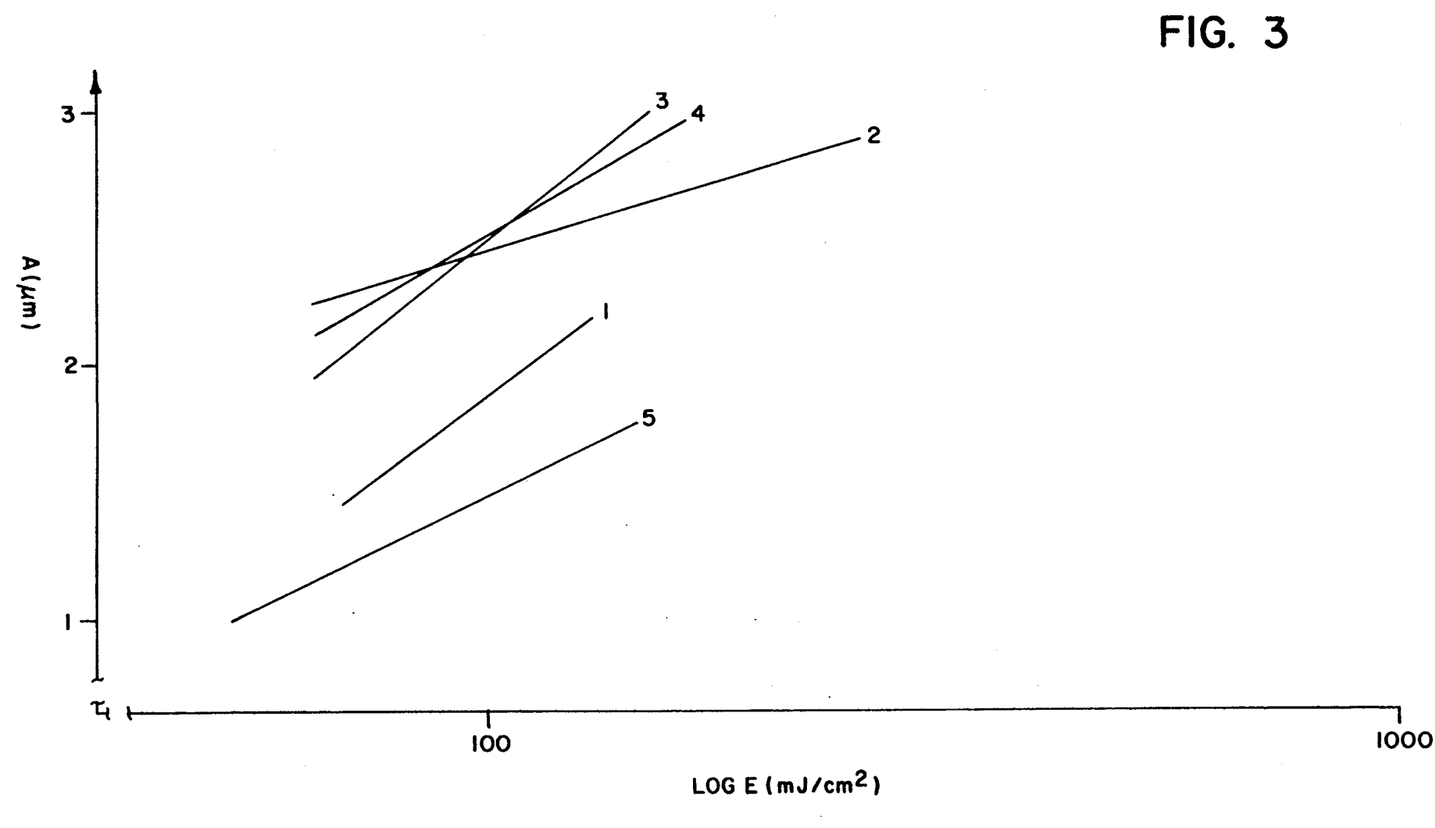
FIG. 3 a graphic presentation of the distance of the depressions, or elevations, respectively, as a function of the energy density of the laser beams.

FIG. 3 shows the distance of adjacent linear depressions as a function of the logarithm of the energy density per pulse. Different fibers, or fabrics, were treated with varying wave lengths of the laser beam. In general it must be noted here that the actual form of the microstructuring is determined by the first beam impulse, while the subsequent beam impulses essentially increase the depth of the depressions and the height of the elevations and change the distance only minimally. In the diagram shown in FIG. 3 only one beam impulse, respectively, was fired at the sample, with variations of the energy. The straight lines 1 and 3 apply to a polyester fiber with trilobal cross-section, the straight line 2 to a polyester sieve netting, and the straight lines 4 and 5 to two polyester sieve nettings. The straight lines 1, 2 and 5 were obtained by irradiating the samples with an ArF-Excimer laser at 193 nm, and the straight lines 3 and 4 were obtained by irradiating the samples with a KrF-Excimer laser at 248 nm, while the energy density of the beam impulses was varied in the area noted.

Figure 4:
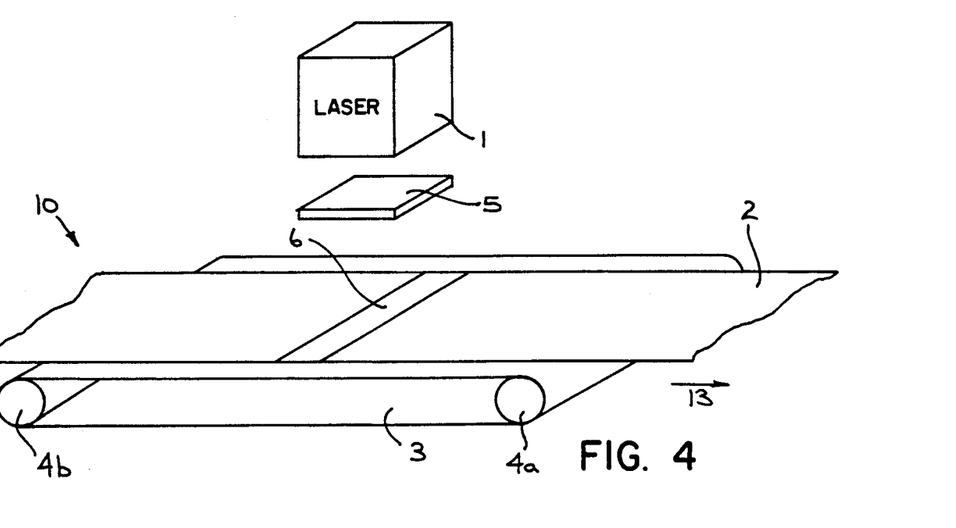
FIG. 4 a first form or embodiment of a device for the irradiation of flat articles.

FIG. 4 shows a device which in its entirety is designated as 10, which is used for finishing flat article or nonwoven materials. This device has a conveyor, which consists of two rollers 4a and 4b, an endless conveyor belt 3 running between these rollers, and a draw-off device (not shown). The conveyor continuously transports an endless web 2 of a flat article or nonwoven material in the direction of the arrow 13 at a continuous speed. Above the endless web a laser 1 is located, which generates radiation. The beams generated by the laser 1 are directed at the web by means of schematically shown expansion device 5 located in the beam path, so that they irradiate an area 6 with uniform intensity. Of course, it is also possible to use a series of lasers placed side by side instead of the one laser 1, and to use one or more focusing devices instead of the expansion device 5, which focusing devices direct the beams generated by the lasers at the web in such a way that the area 6 is divided into a number of individual sections located side by side. In connection with a covering device these individual sections can then be selectively covered, with the result that, viewed across its width, and when moving in the direction of the arrow 13, the web is partially irradiated, or not irradiated, along its longitudinal dimension, so that a patterned surface change is obtained.

Figure 5:
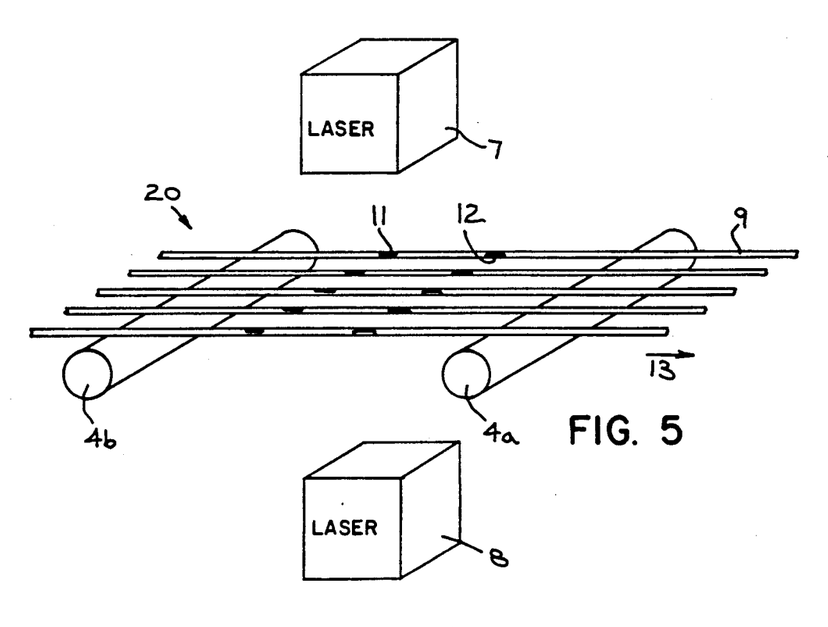
FIG. 5 a further form or embodiment of the device for the irradiation of yarns.

A further form of embodiment shown in FIG. 5 of a device designed in its entirety as 20 is used for finishing an endless web of yarn 9 which, in the form of embodiment shown in FIG. 5, consists of a band of five individual yarns, which are shown only in an exemplified manner. The number of individual yarns depends on the area which the laser can irradiate. The band of the yarns is transported by a conveyor in the direction of the arrow 13 at a certain speed, which is adapted to the desired surface change and to the power of the laser irradiation; the conveyor includes a draw-off device (not shown) and two rollers 4a and 4b. Above and below the yarn web 9 one each laser 7, or 8, respectively, is located, the beams of which are directed by means of an expansion device (not shown) at the web in such a way that the upper laser 7 irradiates an upper yarn area 11, and the lower laser 8 irradiates a lower yarn area 12, which is shown by a dotted line. This type of arrangement assures that, as viewed across the circumference of the yarn, a uniform irradiation of the surface and thus a uniform surface change takes place. In order to prevent a sagging of the yarns and therefore a change in their distance to the upper laser 7 or the lower laser 8, the section between the two rollers 4a and 4b of the version shown in FIG. 5 is considerably shorter as compared with the device shown in FIG. 1 since, as the result of the above-described placement of the lasers, the yarn irradiation device precludes the use of a conveyor belt to support the web.

The following examples have the purpose of clarifying the advantages which are attainable with the invention's process.

EXAMPLE 1

With the use of laboratory equipment a polyester fabric with a weight of 80 g/m$^2$ and a warp density of 25 threads/cm and a weft density of 35 threads/cm was treated with laser irradiation. The laser used was a KrF-Excimer laser with a wave length of 248 nm, and an area of 2 cm$^2$ was irradiated with one impulse as well as with ten impulses. The energy of one beam impulse was 400 mJ. In the samples thus irradiated, water absorption was measured gravimetrically after 48 hours of storage in standard climate at 20° C. and 65% relative humidity. The following results were obtained:

Untreated sample: Water absorption 0.5%
Treated sample, 1 beam impulse: Water absorption 4%
Treated sample, 10 beam impulses: Water absorption 7%.

EXAMPLE 2

A polyester fabric with a weight of 100 g/m$^2$, a warp density of 40 threads/cm and a weft density of 50 threads/cm was irradiated as described in example 1; for this test, an ArF-Excimer laser with a wave length of 193 nm was used. The energy of the beam impulse was 200 mJ. The following water absorption values were obtained:

Untreated sample: Water absorption 0.4%.
Treated sample, one impulse: Water absorption 2.3%
Treated sample, 10 beam impulses: Water absorption 4.9%

With respect to the two preceding examples it should be mentioned that in both cases the sample was treated from one side only with one or ten non-focused beams.

EXAMPLE 3

Of the fabric mentioned in example 1, one each of a section of a non-treated sample, of a sample treated with one beam impulse and of a sample treated with ten beam impulses was printed with pigment. The printing paste contained 280 g bonding agent (200 g Acramin VLC, 30 g Acracone 0, 50 g Acrafix M), 20 g pigment (Acramin Marine Blue FBC), 3 g triethanolamine and 697 g water. After application of the printing paste, drying for one minute at 120° C., and condensing at 170° for three minutes, the adhesion of the print to the fabric was tested with a Crockmeter.

Staining of accompanying cotton fabric as per grey scale after

|  | 50 friction cycles | 100 friction cycles | 250 friction cycles |
| --- | --- | --- | --- |
| untreated sample | 2-3 | | |
| irradiated sample, 1 beam impulse | 3-4 | 3 | 2-3 |
| irradiated sample, 10 beam impulses | 4 | 4 | 3-4 |

As can be seen in the above table, the adhesion of the pigment print is considerably worse in the untreated sample than in the irradiated samples, as evidenced by the respective grades, particularly after 100 or 250 friction cycles.

As proven by sample 1, the use of the invention's process considerably improves water absorption, particularly in synthetic fibers, so that the clothing which is made with these has excellent physiological properties. This is manifested on the one hand by improved moisture or water absorption, and on the other hand by increased water exchange, so that clothing of this type has the advantages of natural fibers with respect to wearing comfort, as well as the advantages of synthetic fibers with respect to simple care. Furthermore, irradiation according to the invention of fibers, filaments, yarns, flat articles or nonwoven material of synthetic fibers, or containing these yarns, has the result that very unpleasant electrostatic charging occurs not at all or in a very limited way, which is ascribed to the above-described increased water absorption. Thus, the use of the invention's process can achieve in a very simple manner a permanent antistatic finishing of fibers etc., which is extremely interesting, not only for clothing, but also for carpet floors or dust filters.

In addition, the use of the invention's process with fiber bonding substances can considerably increase the adhesion between the matrix into which the fibers are bedded and the fibers themselves, with the result that such fiber bonding substances have considerably improved strength and decreased wear tendencies, and consequently longer service life. The fibers are preferably irradiated immediately after spinning, such at that time, as viewed across its circumference, the fiber is still accessible from all sides and optimal surface roughening can be obtained, which is seen as the cause of the improvement of adhesion between the matrix and the fibers. Generally speaking, such a process should be used particularly with such fibers which have a smooth, non-profiled surface, which applies, for example, to PTFE or Aramid fibers or fiber mixtures.

EXAMPLE 4

Polyester woven goods with a weight 99 g/m$^2$ and a warp density of 375 threads/dm and a weft density of 340 threads/dm was rinsed with the conventional processes and subsequently fixed at 190° C. The warp threads had 76 individual filaments and a denier of 105 dtex, and the weft threads also had 76 individual filaments, and a denier of 156 dtex.

An area of the above-mentioned polyester fabric was irradiated with two light beam impulses generated by an ArF-Excimer laser; the energy of the light beam impulses was 57 mJ/cm$^2$ and the wave length was 193 nm. After both beam impulses had been directed at the surface of the area of the polyester fabric, the light beam was moved according to a predetermined geometric pattern in such a way that a section adjacent to this area was also treated with two light beam impulses.

Subsequently the polyester fabric irradiated in this manner was dyed in a laboratory dyeing facility with a bath ratio of 1:15; the dyeing bath had the following composition:

1% C.I. Disperse Blue 79, 200 per cent
0.5 g/l of a deflocculation agent on the basis of a condensation product of aromatic sulfonic acids
0.25 ml/l acetic acid The coloring substances were premixed in the conventional manner and the dyeing was begun at a starting temperature of 60° C. Subsequently the dyeing bath was heated at 1° C./min to 130° C. After a dwell period of 30 minutes at the above temperature the bath was cooled at 1° C./min to 80° C. There followed an alkaline reductive purification with sodium hydrosulfide in the conventional concentration.

After dyeing and drying the sample was at first visually evaluated. It was apparent that the patterned areas had been dyed in a considerably darker shade. The geometric pattern created by the movement of the light beam was clearly visible and had a sharp outline.

Sections were taken from the irradiated and non-irradiated areas of the polyester fabric, and their dye concentration was determined quantitatively after dissolving the fiber substrate. It was noted that the irradiated sample showed 8% more dye absorption than the non-irradiated sample.

With respect to rubbing-resistance, sweat resistance, bleaching resistance and dry heat bleaching resistance, thre were no differences between the irradiated and non-irradiated areas.

EXAMPLE 5

The above-described polyester fabric was irradiated in a manner analogous to example 4, however, ten light beam impulses with an energy of 85.2 mJ/cm$^2$ were directed at the selected area of the surface. Subsequently, the light beam was moved according to the predetermined pattern to an adjacent area, and the ten light beams were again emitted.

The sample of the polyester fabric treated in this manner was dyed and retreated as described above.

After dyeing and drying the sample was visually evaluated. It was noted that the irradiated areas were considerably still more deeply or darkly dyed, so that the geometric pattern showed up even more clearly. The subsequent colorimetric evaluation showed that the irradiated areas were dyed 35% more darkly than the non-irradiated areas. The sharpness of the outline of this sample was excellent. It was noted there, too, that there were no differences in the color-fastness.

EXAMPLE 6

A pile floor carpet with a polyamide nub layer of 500 g/m$^2$ was reoriented by 140° over one edge. The pile nubs which were freely accessible to the light team at the edge were irradiated in selected areas in such a way that the light beam was concentrated on about the upper third of the pile nub and was moved according to a randomly selected pattern. Simultaneously, the pile floor carpet was transported relative to the laser generating the light beam; the speed of the laser movement was 10 cm/min and the transport speed of the pile floor carpet was 5 cm/min. An ArF-Excimer laser was used, and 100 beam impulses were emitted at each irradiated section of the patterned area. The energy of the beam impulses was 100 mJ/cm$^2$.

By reduction of the upper third of the irradiated pile nubs a three-dimensionally patterned pile floor carpet was created, and the pattern produced in this manner was still clearly visible after intensive mechanical stress.

EXAMPLE 7

A polyester fabric irradiated as in example 5 was dyed after irradiation with the following combination of coloring substances:

0.7% C.I. Disperse Blue 56
0.7% C.I. Disperse Red 1
0.7% C.I. Disperse Yellow 60

The dyeing and the reductive purification was conducted according to example 4.

After dyeing and drying the sample was visually evaluated. It was noted that the dye absorption was clearly higher in the patterned areas produced by irradiation than in the non-irradiated areas; the difference in color shade was estimated at ca. 30 to ca. 40%. In addition there was a color shade difference between irradiated and non-irradiated areas. Thus, the non-irradiated area of the polyester fabric was dyed in an olive-green brown, while the irradiated areas shows a shift in color shade to a considerably fuller, reddish-blue brown.

In addition to the above-described dyeing another dyeing-process was implemented with the same combination of coloring substances, in which the dye bath contained an additional 0.25 g/l of a levelling agent on the basis of a preparation of alkyphenol and fatty-acid polyglycolethers.

The comparison of the dyeings with and without the levelling agent showed that, in the dyeing without the levelling agent, the difference between the irradiated and non-irradiated areas was considerably greater. A deterioration of the above-mentioned resistances in the irradiated areas could not be detected. Comparative tensile strength measurements showed that no difference whatsoever existed between the irradiated and the non-irradiated areas.

EXAMPLE 8

In a laboratory facility a polyester fabric with a weight of 80 g/m$^2$ and a warp density of 25 threads/cm and a weft density of 32 threads/cm was treated with laser irradiation. The laser used was a KrF-Excimer laser with a wave length of 248 nm; an area of 2 cm$^2$ was irradiated with one impulse as well as with 10 impulses. The energy of a beam impulse was 400 mJ. The irradiation was conducted in a $CO_2$ and a $SO_2$ gas atmosphere.

The water absorption of the samples treated in this manner was measured gravimetrically after 40 hours of storage in standard climate at 20° C. and 65% relative humidity. The following results were obtained:

untreated sample, water absorption: 0.5%
treated sample, 1 beam impulse, $CO_2$ atmosphere, water absorption: 6%
treated sample, 10 beam impulses, $CO_2$ atmosphere, water absorption: 8%
treated sample, 1 beam impulse, $SO_2$ atmosphere, water absorption: 8%
treated sample, 10 beam impulses, $SO_2$ atmosphere, water absorption: 10%.

A dye test according to Melliand-Textilber, 60 (1979, 272) was used as proof of the acid groups which were formed on certain areas of the surface during irradiation in the acid gas atmosphere.

In the dye test the nonirradiated sample did not accept the dye, while all irradiated samples accepted the dye with increasing intensity in the sequence $CO_2$ atmosphere, 1 beam impulse; $CO_2$ atmosphere, 10 beam impulses; $SO_2$ atmosphere, 1 beam impulse; $SO_2$ atmosphere, 10 beam impulses; the dyeing was dotted and linear. This permits the conclusion that acid groups occurred at the surface of the fabric as the result of the irradiation, which acid groups can be ascribed to a splitting of the surface molecules and to reaction with the acid gas.

Furthermore, the surface resistance of all samples was measured with the annular electrode method. The samples had been previously sufficiently conditioned in standard climate (23° C., 65% relative humidity). The following values were obtained:

untreated sample $10^{13}$ Ohm;
$CO_2$ atmosphere, 1 beam impulse, $10^{10}$ Ohm;
$CO_2$ atmosphere, 10 beam impulses, $10^9$ Ohm;
$SO_2$ atmosphere, 1 beam impulse $10^8$ Ohm;
$SO_2$ atmosphere, 10 beam impulses $10^7$ Ohm.

As the above values prove, the fabric which was chemically and physically modified in its surface has clearly improved surface resistances, which is ascribed to the presence of polar groups. Thus, the samples which were irradiated in a reacting gas atmosphere were permanently antistatic without the application of a corresponding finish.

EXAMPLE 9

The polyester fabric described in example 8 was irradiated in a laboratory facility. An ArF-Excimer laser with a wave length of 193 nm was used. The irradiation was conducted in a $NH_3$ atmosphere. Each sample was treated with one impulse and with ten impulses; the energy of a beam impulse was 200 mJ. Subsequently, one untreated sample and the two irradiated samples were given a two-component polyurethane coating at 80 g/m$^2$. After drying and condensation the bending-stress durability was measured (Balli-Flexometer), which led to the following results:

|  | untreated sample | 1 beam impulse | 10 beam impulse |
| --- | --- | --- | --- |
| 1. at 20° C. dry | 150,000 flexures, slight loosening of coating in the flex area | 200,000 flexures, slight loosening of the coating in the flex area | 250,000 flexures, no finding |
| 2. at 20° C. wet | 130,000 flexures, damage as in 1 | 180,000 flexures, no finding | 250,000 flexures, no finding |

As these results show, irradiation treatment in the ammonia atmosphere clearly improves bending stress durability. This is ascribed to the fact that, in addition to the microstructuring, basic groups occur at the surface of the fabric, which react with the acid groups that are present in the polyurethane coating and thus improve the adhesion of the polyurethane coating on the carrier fabric.

We claim:

1. A process for manufacturing a filament, fiber, yarn, and/or textile or nonwoven goods formed therefrom including the step of irradiating the fiber, filament, yarn, textile and/or nonwoven goods with a laser radiation beam having an energy density in a range of 5 mJ/cm$^2$ to 500 mJ/cm$^2$ for heating localized portions of the surface to which the laser radiation beam is applied to melt material of a filament or fiber and/or to thermally remove material from said portions to form a surface microstructure comprising linear depressions and/or elevations on a filament and/or fiber extending primarily transversely with respect to the longitudinal axis of the fiber and/or filament, said depressions and/or elevations having widths up to about 1 micrometer, a spacing between them of about 1 micrometer to 5 micrometers, and a depth or height, respectively, of up to 100 micrometers, said microstructure extending over about 10% to about 100% of the surface of the fiber and/or filament.

2. The process according to claim 1 further defined as carrying out the irradiating with pulses of laser radiation, said pulses having a duration in a range of $10^{-3}$ to $10^{-15}$ seconds.

3. The process according to claim 1 further defined as carrying out the irradiating with pulses of laser radiation at pulse rates of between 1 Hz and 250 Hz.

4. The process according to claim 2 further defined as carrying out the irradiating with pulses of laser radiation at pulse rates of between 1 Hz and 250 Hz.

5. The process according to claim 1 further defined as carrying out the irradiating with laser radiation having a wavelength in a range of 5 nm to 1200 nm.

6. The process according to claim 1 further defined as carrying out the irradiating with a gas pulse laser.

7. The process according to claim 6 further defined as carrying out the irradiating with an Excimer laser.

8. The process according to claim 6 further defined as carrying out the irradiating with a KrF or ArF laser and with radiation wavelengths of 248 or 193 nm.

9. The process according to claim 1 further defined as irradiating substantially the entire surface of a filament, fiber and/or yarn.

10. The process according to claim 1 further defined as irradiating at least one side of textile or nonwoven goods.

11. The process according to claim 1 further defined as irradiating textile or nonwoven goods with the laser radiation beam and thereafter applying a coating to the goods.

12. The process according to claim 1 further defined as irradiating textile or nonwoven goods with the laser radiation beam and thereafter printing or dyeing the goods.

13. The process according to claim 1 further defined as one for finishing nonwoven goods used for filtration purposes and wherein the laser beam irradiation occurs during the production of the nonwoven goods.

14. The process according to claim 1 wherein relative movement is provided between the laser radiation beam and the filament, fiber, yarn, and/or textile or nonwoven goods.

15. The process according to claim 10 further defined in that a web of textile or nonwoven goods is continuously moved and is irradiated by a linear laser beam oriented transversely to the direction of the movement of the web.

16. The process according to claim 1 further defined as carrying out the irradiation in a gaseous environment.

17. The process according to claim 1 further defined as carrying out the irradiation in a protective environment.

18. The process according to claim 17 further defined as carrying out the irradiation in an atmosphere of protective gas.

19. The process according to claim 17 further defined as carrying out the irradiation in a vacuum.

20. The process according to claim 1 further defined as carrying out the irradiation in a reactive environment.

21. The process according to claim 20 further defined as carrying out the irradiation in an atmosphere containing at least one reactive gas.

22. The process according to claim 21 further defined as carrying out the irradiation in an atmosphere containing an acidic or basic gas.

23. The process according to claim 21 further defined as carrying out the irradiation in an atmosphere containing a gas having oxygen compounds with carbon, nitrogen and/or sulfur.

24. The process according to claim 21 further defined as carrying out the irradiation in an atmosphere containing a gas having an interhalogen compound and/or a halogen-hydrogen compound.

25. The process according to claim 21 further defined as carrying out the irradiation in an atmosphere containing a gas having at least a double or triple bond.

26. The process according to claim 21 further defined as carrying out the irradiation in an atmosphere containing an inert gas mixed with the reactive gas.

27. The process according to claim 1 further defined as irradiating a thermoplastic fiber.

28. The process according to claim 15 further defined as irradiating a textile of thermoplastic fibers.

29. The process according to claim 21 further defined as irradiating a thermoplastic fiber.

30. The process according to claim 1 further defined as carrying out the irradiating to form lineal depressions and/or elevations which extend over ca. 20% to ca. 80% of the surface of the fiber and/or filament.

31. The process according to claim 30 further defined as carrying out the irradiating to form lineal depressions and/or elevations which extend over ca. 40% to ca. 60% of the surface of the fiber and/or filament.

32. The process according to claim 1 further defined as carrying out the irradiating to form depressions and/or elevations which have a depth or height, respectively, of between ca. 1 micrometer and ca. 4 micrometers.

33. The process according to claim 1 further defined as carrying out the irradiating to form lineal depressions and/or elevations which have a depth or height, respectively, of between ca. 0.1 micrometer and ca. 2 micrometers.

34. The process according to claim 33 further defined as carrying out the irradiating to form lineal depressions and/or elevations which have a depth or height, respectively, of between ca. 0.5 micrometer and ca. 1 micrometer.

35. The process according to claim 1 further defined as carrying out the irradiating to form lineal depressions and/or elevations which have a width up to ca. 0.5 micrometer and a spacing between them of ca. 1 micrometer to 3 micrometers.

36. A filament, fiber, yarn, and/or textile or nonwoven goods formed therefrom produced by the process according to claim 1.

37. A filament, fiber, yarn, and/or textile or nonwoven goods formed therefrom produced by the process according to claim 15.

38. A filament, fiber, yarn, and/or textile or nonwoven goods formed therefrom produced by the process according to claim 21.

* * * * *

UNITED STATES PATENT AND TRADEMARK OFFICE
CERTIFICATE OF CORRECTION

PATENT NO. : 5,017,423
DATED : May 21, 1991
INVENTOR(S) : Adelgund Bossmann et al It is certified that error appears in the above-identified patent and that said Letters Patent is hereby corrected as shown below:

Column 19, line 12, delete "100" and substitute therefor ---10---

Column 19, line 35, after "248" insert ---nm---

Signed and Sealed this

Sixteenth Day of March, 1993

*Attest:*

STEPHEN G. KUNIN

*Attesting Officer*     *Acting Commissioner of Patents and Trademarks*